United States Patent [19]

Bellenger

[11] 4,042,793
[45] Aug. 16, 1977

[54] TELEPHONE MOUTHPIECE KEYBOARD

[75] Inventor: Donald M. Bellenger, San Francisco, Calif.

[73] Assignee: Telephone Electronics Corporation, San Francisco, Calif.

[21] Appl. No.: 644,375

[22] Filed: Dec. 29, 1975

[51] Int. Cl.² .......................................... H04M 1/50
[52] U.S. Cl. ................................. 179/90 K; 179/2 DP
[58] Field of Search ................. 179/90 K, 2 DP, 1 C, 179/2 C, 2 A, 16 EC, 187; 340/365 S

[56] References Cited

U.S. PATENT DOCUMENTS

| 3,080,457 | 3/1963 | Jansson et al. | 179/90 K |
| 3,180,937 | 4/1965 | Moser | 179/1 C |
| 3,299,207 | 1/1967 | Cooke | 179/187 |
| 3,515,806 | 6/1970 | Spraker | 179/2 DP |
| 3,597,543 | 8/1971 | Mallebrein | 179/2 DP |
| 3,619,507 | 11/1971 | Metz | 179/1 C |
| 3,647,972 | 3/1972 | Glover et al. | 179/2 DP |
| 3,676,607 | 7/1972 | Nash et al. | 179/90 K |
| 3,764,746 | 10/1973 | Libby | 179/2 C |
| 3,899,638 | 8/1975 | Hahn | 179/2 DP |

OTHER PUBLICATIONS

Wallet Terminal Keyboard with Acoustic Coupler, Davis, Jr. and Koepf, *IBM Technical Disclosure Bulletin*, vol. 10, No. 3, 8/1967.

*Primary Examiner*—William C. Cooper
*Assistant Examiner*—Gerald L. Brigance
*Attorney, Agent, or Firm*—Townsend and Townsend

[57] ABSTRACT

Apparatus and method for providing tone operating capability to a dial telephone is disclosed. The standard mouthpiece together with the original microphone of the dial telephone are removed. The present invention provides a replacement mouthpiece attached to the telephone in place of the standard mouthpiece. The replacement mouthpiece includes a relatively small microphone electrically coupled to the transmitter connections in the telephone and having a sound receiving element. A plurality of keyboard elements are located in the replacement mouthpiece generally around the sound receiving element of the microphone. The keyboard elements correspond to respective telephone operating digits and symbols and are adapted to be actuated by the user of the telephone. The replacement mouthpiece includes means for generating an output signal responsive to the actuated keyboard elements to operate the telephone. The generating means is electrically coupled to the transmitter connections when the replacement mouthpiece is attached to the telephone so that both the output of the microphone and the generated output signal are transmitted through the transmitter connections.

17 Claims, 7 Drawing Figures

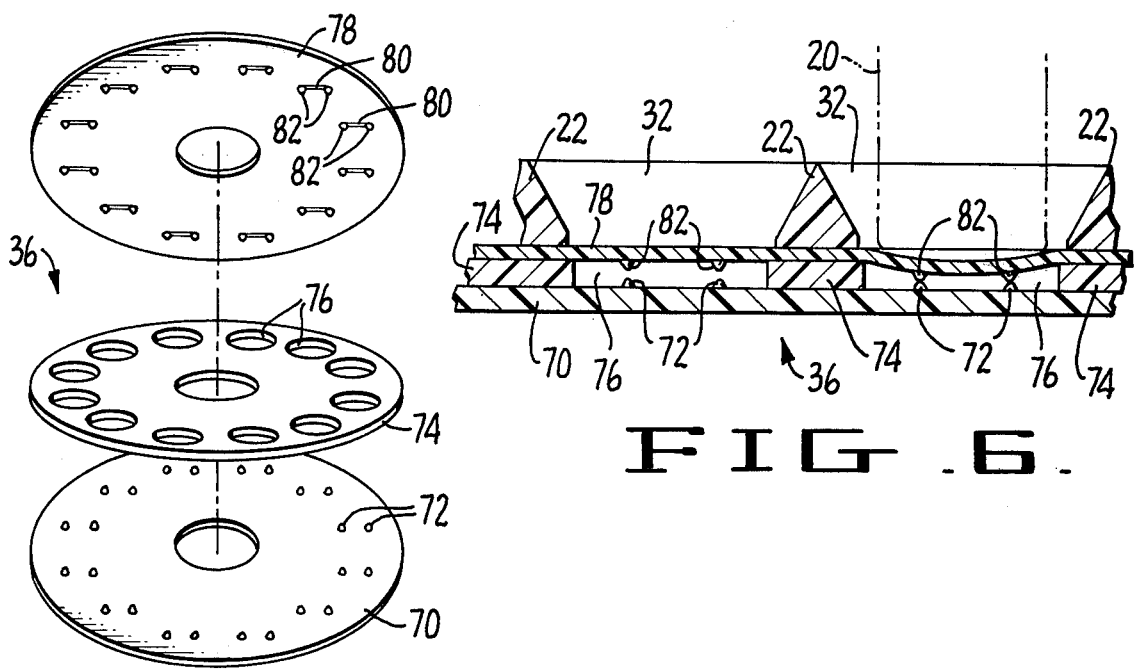
FIG. 5.
FIG. 6.
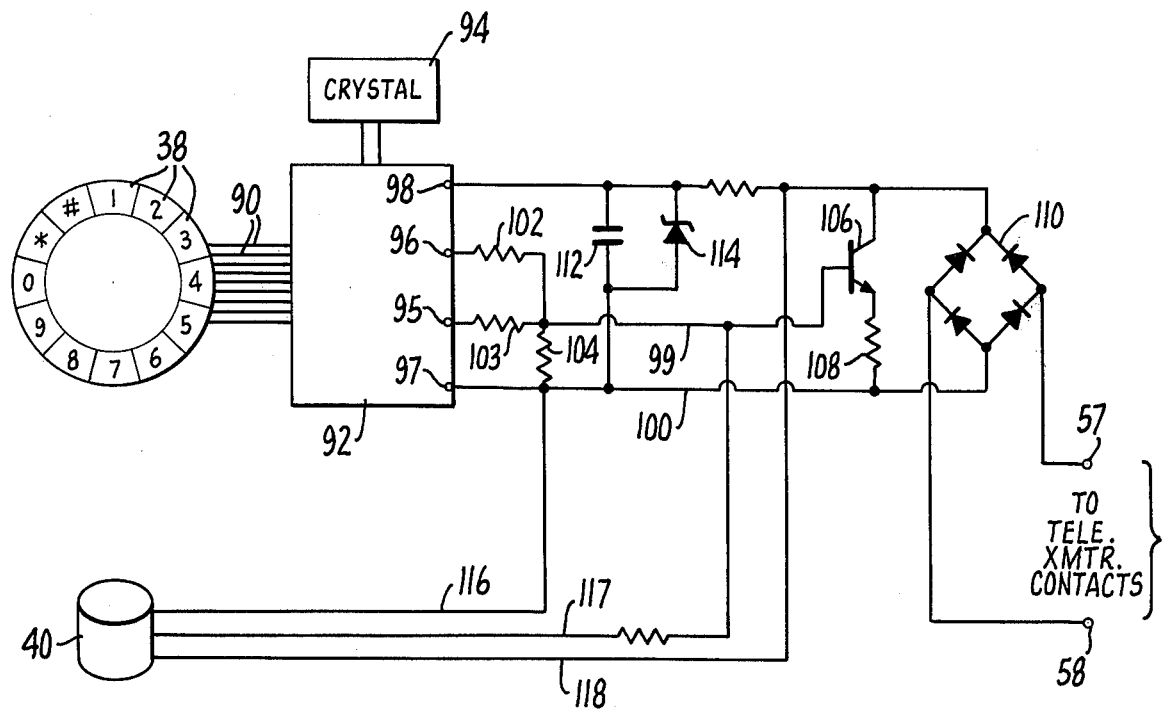
FIG. 7.

TELEPHONE MOUTHPIECE KEYBOARD

BACKGROUND OF THE INVENTION

The present invention relates to apparatus and method for providing tone operating capability to a dial telephone in which the standard mouthpiece including the original microphone is removed and replaced by the mouthpiece of the present invention.

The dial telephone systems which have been in use for years are gradually being replaced by push button telephones. The push button telephone has been found to be more convenient and attractive to the user, and in time it is anticipated that virtually all telephones will be push button. In addition, the use of a push button telephone is required in some situations for use with modern systems requiring coded input such as computers, paging devices and so on.

The push button telephone operates on the basis of a two frequency tonal input command generated by the user by actuating the push buttons in sequence. These input commands can be used not only to place connections with other telephones but also as an input device for other systems. The tonal input replaces the direct current signal used in standard dial telephones which is not a compatible input system for computers, paging devices and the like.

The replacement of dial telephones with push button telephones requires major changes in existing telephone equipment in two broad categories. First, the switching equipment must be changed to accept the tonal input commands of the push button telephone rather than the commands of existing dial equipment. This changeover in switching equipment requires a large capital outlay. Second, as matters now stand, each individual dial telephone must be replaced separately with a push button telephone. The replacement of each individual telephone is relatively expensive not only in equipment cost but also in the manpower required to perform each transfer. Accordingly, the changeover from dial telephones to push button telephones is extremely expensive, both in the switching equipment which must be changed and in the new telephones which must be installed.

Because of the large expense involved in the changeover from dial telephone systems to push button systems, this changeover has been delayed in many areas. Even in areas wherein some of the switching equipment is being changed, not all equipment is changed at once and some lines remain as dial systems. The continued use of the dial systems is undesirable, but at the present time is a financial necessity.

The remaining dial telephone systems have been found to inhibit the use of certain modern equipment, such as telephone operated computers and paging devices. Many such devices require use of tonal commands not to perform the initial connection but to operate the equipment as discussed above. The equipment can be reached by making the connection with a dial telephone, and after the connection has been made, it can be operated by inputing tonal commands. However, at the present time expensive attachments to existing dial telephones are required to provide tonal operating capability to a dial telephone and such attachments are not often used.

SUMMARY OF THE INVENTION

Apparatus and method for providing tone operating capability to a dial telephone is disclosed. The standard mouthpiece together with the original microphone of the dial telephone are removed. The present invention provides a replacement mouthpiece attached to the telephone in place of the standard mouthpiece. The replacement mouthpiece includes a relatively small microphone electrically coupled to the transmitter connections in the telephone and having a sound receiving element. A plurality of keyboard elements are located in the replacement mouthpiece generally around the sound receiving element of the microphone. The keyboard elements correspond to respective telephone operating digits and symbols and are adapted to be actuated by the user of the telephone. The replacement mouthpiece includes means for generating an output signal responsive to the actuated keyboard elements to operate the telephone. The generating means is electrically coupled to the transmitter connections when the replacement mouthpiece is attached to the telephone so that both the output of the microphone and the generated output signal are transmitted through the transmitter connections.

The present invention operates to reduce the expense encountered in the changeover from dial telephone systems to push button telephones. The mouthpiece of the present invention merely attaches to a standard dial telephone in place of the existing mouthpiece. When switching equipment has been changed from dial to push button, the replacement mouthpieces of the present invention can merely be mailed out to telephone subscribers by the telephone company. The replacement mouthpieces can be installed by the telephone users themselves, virtually eliminating labor costs, and the cost of the replacement mouthpiece is minimal relative to the cost of the entire telephone.

In addition to facilitating the changeover from dial telephone systems to push button telephones, the present invention can be used to provide dual capacity to existing dial telephones. In areas which the switching equipment is limited to dial telephones, the connection can be made to a modern tonal operated system such as a computer by using the dial portion of a telephone having the mouthpiece of the present invention installed. After establishing the connection, the push button mouthpiece provided by the present invention can be used to operate the computer system.

The novel features which are characteristic of the invention, both as to organization and method of operation, together with further objects and advantages thereof, will be better understood from the following description considered in connection with the accompanied drawings which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 5 is an exploded view of the preferred keyboard of the present invention;

FIG. 6 is an expanded fragmentary cross-sectional view of two of the keyboard elements used in the present invention;

FIG. 7 is a schematic view of a preferred embodiment of the electrical system of the present invention.

DESCRIPTION OF THE PREFERRED EMBODIMENT

Figure 1:
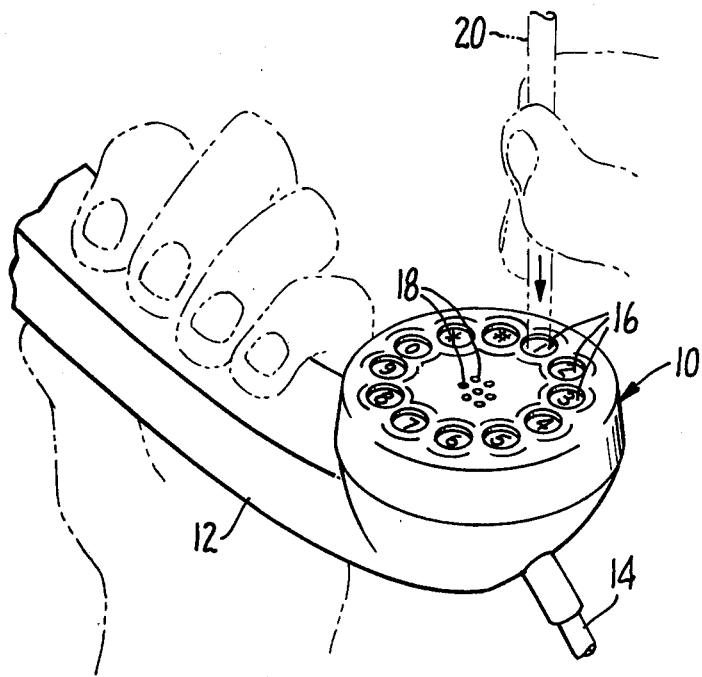
FIG. 1 is a perspective view illustrating use of a telephone handpiece modified according to the teachings of the present invention.

The manner in which the mouthpiece 10 of the present invention is incorporated in a standard telephone handpiece 12 is illustrated by way of reference to FIG. 1. Handpiece 12 is typical of standard handpieces connected to the body of a dial telephone by a cord 14. In such telephones, a dialing mechanism is located on the body of the telephone, and the handpiece 12 has one end such as at mouthpiece 10 for speaking and another opposite end having an earpiece (not shown) for listening. Handpiece 12 is lifted off of the body of the telephone and is held by hand for speaking and listening, and the dial mechanism on the body of the telephone is used for placing a call to another telephone.

In the present invention, the standard mouthpiece of a dial-type telephone and its associated microphone are removed and replaced with the mouthpiece 10 of the present invention. As will be illustrated in more detail hereinafter, the mouthpiece 10 of the present invention includes a plurality of push buttons 16 disposed around the circumference of the mouthpiece. Holes 18 are provided to permit the transmission of sound to the exterior of the mouthpiece.

Mouthpiece 10 provides a sound input device as with previous telephones, but in addition allows for the establishment of a connection with another telephone using push button input. Pushbuttons 16 can be actuated by the user's finger or with a pencil 20 as illustrated rather than using the dial mechanism of the body of the telephone to place a call. After the connection has been established with another telephone, the telephone can be used in a conventional manner.

Figure 2:
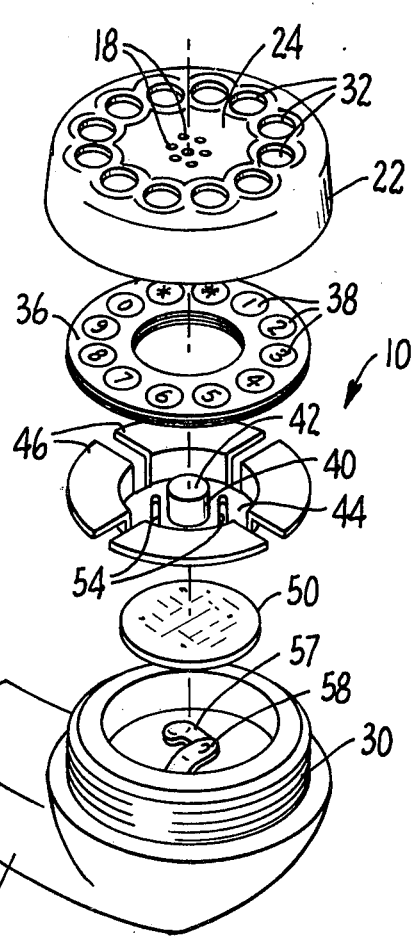
FIG. 2 is an exploded view of the mouthpiece of the present invention as incorporated in a standard telephone.
Figure 3:
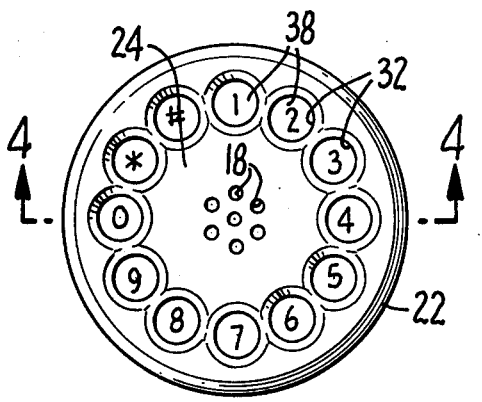
FIG. 3 is a top view of the mouthpiece of the present invention.
Figure 4:
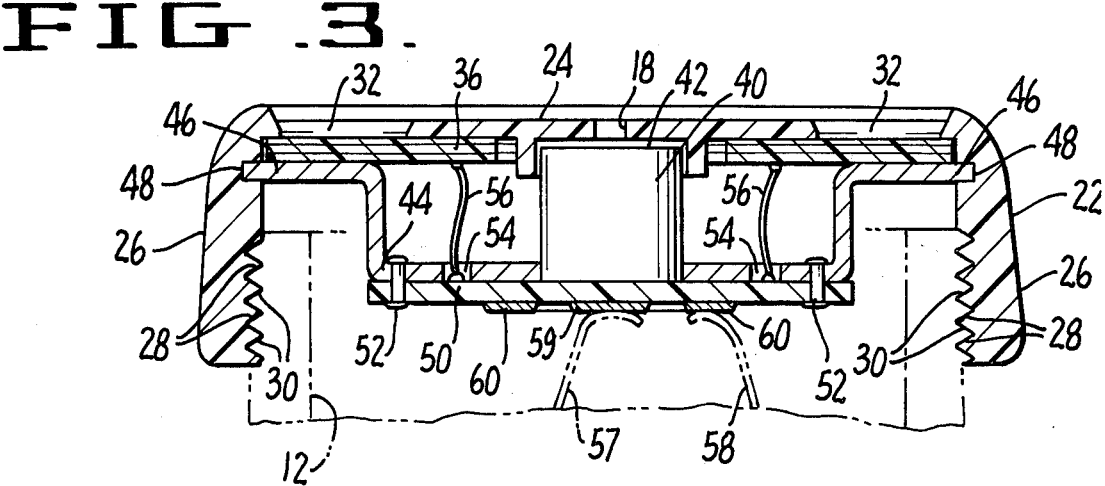
FIG. 4 is a section view taken along lines 4—4 of FIG. 3.

The preferred embodiment of mouthpiece 10 is illustrated in more detail by way of reference to FIGS. 2-4 in combination. Mouthpiece 10 includes a mouthpiece cap 22, preferably constructed of rigid plastic material as is the remainder of the telephone housing. Mouthpiece cap 22 has a flat portion defining an exterior face 24 and a circumferential lip 26. Female threads 28 are provided on the interior of lip 26. Female threads 28 threadably engage complementary male threads 30 on the existing handpiece 12 to attach mouthpiece cap 22 to the handpiece in place of the standard mouthpiece.

The plurality of holes 18 are located at the exterior face 24 of mouthpiece cap 22 to allow sound to pass through the mouthpiece cap at the exterior face. In addition, a plurality of apertures 32 are disposed around holes 18. In the preferred embodiment, apertures 32 are disposed in a circumferential ring around the holes 18 at the periphery of exterior face 24 of mouthpiece cap 22. However, it is contemplated that apertures 32 need not be disposed in a circumferential ring, as long as they are located generally around holes 18.

A keyboard 36 is located immediately beneath the exterior face 24 of mouthpiece cap 22. Keyboard 36 includes a plurality of keyboard elements or buttons 38 in registry with the apertures 32 in mouthpiece cap 22. Each keyboard element 38 corresponds with a standard digit or symbol used in the operation of a push button telephone. When keyboard elements 38 are depressed by the user of the telephone, an output signal is generated, as discussed in more detail hereinafter.

A relatively small microphone 40 is located so that its sound receiving face 42 is disposed immediately below holes 18 in mouthpiece cap 22. In a preferred embodiment of the present invention, a PRIMO microphone Model Number EM-60 is used, which is distributed by Primo Microphone Inc., Elk Grove Village, ILL. However, other similar microphones can be used as well. Such microphones are far smaller than the carbon granule microphone normally used in telephone equipment and which substantially fill all the space under the mouthpiece cap. However, unlike the standard carbon granule microphone, the output of the relatively small microphone 40 needs amplification, as discussed in more detail hereinbelow.

Microphone 40 is mounted on a carrier 44. Carrier 44 has a plurality of outwardly directed, discrete flanges 46. In the construction of mouthpiece 10, keyboard 36 is inserted within mouthpiece 22 until it is flush with the underside of exterior face 24. Carrier 42 is inserted and the flanges 46 thereof are snapped into a complementary groove 48 on the interior of mouthpiece end 22, fixing microphone 40 and keyboard 36 in position.

A printed circuit board 50 is located on the underside of carrier 44. In the preferred embodiment of the present invention, printed circuit board 50 is attached to carrier 44 by means of plastic rivets 52. However, printed circuit board 50 can be otherwise bonded to carrier 44. Carrier 44 has a pair of slots 54 located therein. An electrical connection can be established between keyboard 36 and printed circuit board 50 by wires 56 extending through slots 54 between printed circuit boards 36 and 50.

Handpiece 12 includes a pair of transmitter connections 57, 58 normally connected to the standard carbon granule microphones supplied with the original telephone. In the mouthpiece of the present invention, printed circuit board 50 is provided with contacts 59, 60 on the underside thereof. When mouthpiece 10 is attached to handpiece 12, contacts 59, 60 are biased against transmitter connections 57, 58 to provide an electrical connection between the transmitter connections and the printed circuit board 50. Printed circuit board 50 is electrically connected to microphone 40 and keyboard 36 so that both the output of the microphone and that of the keyboard can be input through transmitter connections 57, 58.

The construction of the preferred keyboard 36 of the present invention is illustrated by way of reference to FIGS. 5 and 6. In each of these figures, the thickness of the various elements is greatly exaggerated for clarity. Keyboard 36 is a variation of standard monopanel printed circuit boards produced by the Centralab Division of Globe-Union Inc., Milwaukee, Wis.

Keyboard 36 has three basic layers. The bottom layer is an underlying printed circuit layer 70, containing the bulk of the keyboard printed circuits. Printed circuit layer 70 includes a plurality of contact pairs 72 on its upper surface. A thin Mylar spacer 74 having approximately 5 mil. thickness overlies printed circuit layer 70. A plurality of apertures 76 are located around the circumference of sheet 74 to expose the various contact pairs 72 on printed circuit layer 70. A flexible Mylar sheet 78 having approximately 0.005 thickness overlies sheet 74. Flexible sheet 78 includes a plurality of circuits 80 etched on the underside thereof and terminating at contacts 82.

As illustrated in FIG. 6, the apertures 32 in mouthpiece cap 22 expose the flexible Mylar sheet 78 proximate the apertures 76 in spacer 74. The numbers or symbols representing a telephone command signal (not visible in FIGS. 5 and 6) are located on the upper surface of sheet 78 in registry with apertures 32.

Ordinarily, contacts 82 on Mylar sheet 78 are spaced from contacts 72 on printed circuit layer 70. However, when flexible Mylar sheet 78 is depressed, as with a pencil as illustrated at 24 or with the user's finger, an electrical connection is made between contacts 82 and contacts 72. A signal is generated corresponding to such actuation as illustrated hereinbelow to operate the telephone.

The electrical system of the present invention is illustrated by way of reference to FIG. 7. The electrical system is responsive to the keyboard elements 38. Keyboard elements 38 are connected by a plurality of leads 90 to a chip 92. Chip 92 in combination with a 1 mhz. crystal 94 generates a high and low frequency output at terminals 95, 96 respectively corresponding to the actuated keyboard element. Terminals 97, 98 of chip 92 are connected to source and drain voltages respectively. Chip 92 is preferably that produced by Motorola, Model No. C 14410P, but other such chips can be used as well.

The high and low frequency output from terminals 95, 96 is communicated to leads 99, 100 through resistors 102-104. Resistors 102 and 103 are preferably 20 K ohms and resistor 104 is preferably 30 K ohms. The high and low frequency output is amplified through transistor 106, preferably a 2N 4401 transistor, through 51 ohm resistor 108. The output is then rectified at 110 and transmitted to telephone transmitter contacts 57, 58.

The amplifier stage including transistor 106 is preferably located in printed circuit board 50. A 10 microfarad capacitor 112 and a 6.3 volt Zener diode 114 are included in the amplifier stage to stabilize the voltage transmitted to chip 92.

Microphone 40 is also connected to the amplifier stage by leads 116–118. As a result, the output of microphone 40 is also amplified by the amplifier stage and transmitted to transmitter contacts 57, 58. Accordingly, the amplifier stage serves a dual function of amplifying not only the commands generated by keyboard elements 38 but the output of microphone 40 as well.

In operation, a standard dial telephone is modified according to the teachings of the present invention by first removing the standard mouthpiece and microphone. The mouthpiece is ordinarily threadably engaged with the handpiece of the telephone and can simply be disengaged by turning it in a counterclockwise direction. The mouthpiece of the present invention is thereafter engaged with the handpiece of the telephone by threadably engaging it with the handpiece in place of the original mouthpiece and microphone.

With the mouthpiece of the present invention installed, a connection can be made with another telephone by depressing the appropriate keyboard elements of the mouthpiece in series if the telephone line is provided with tonal input switching equipment. Thereafter the telephone can be used in the normal manner by speaking into the mouthpiece and listening at the earpiece. In addition, if a connection is established between the telephone and a system such as a computer or paging device responsive to tonal input, the telephone can be used as an input device.

The present invention is also useful in some circumstances for modifying dial telephones which are not connected to switching equipment that accepts tonal input. A connection can be made with a system such as a computer or paging device using the dial mechanism of the telephone in the normal manner. After the connection has been established, the telephone can be used as an input device by depressing the appropriate keyboard elements.

While a preferred embodiment of the present invention has been illustrated in detail, it is apparent that modifications and adaptations of that embodiment would occur to those skilled in the art. In particular it is noted that many variations are possible on the electrical system of the present invention. Also, different keyboard arrangements and systems could be employed. However, it is to be expressly understood that such modifications and adaptations are within the spirit and scope of the present invention, as set forth in the following claims.

What is claimed is:

1. Apparatus for providing tone operating capability to a dial telephone in which the standard mouthpiece including the microphone normally electrically coupled to one or more transmitter connections in the telephone is removed, said apparatus comprising a replacement mouthpiece attachable to said telephone in place of the standard mouthpiece, said replacement mouthpiece including:
   a relatively small microphone having a sound receiving element, said relatively small microphones being electrically coupled to the transmitter connections upon attachment of the mouthpiece to said telephone;
   a plurality of keyboard elements located generally around the sound receiving elements of the relatively small microphone, said keyboard elements corresponding to respective telephone operating digits and symbols and adapted to be individually actuated by a user of the telephone; and
   means for generating an electrical output signal representing a tone signal responsive to the actuated keyboard elements, said generating means being electrically coupled to the transmitter connections upon attachment of the replacement mouthpiece to said telephone to provide tone operating capability to said telephone.

2. Apparatus as recited in claim 1 wherein said replacement mouthpiece additionally includes a mouthpiece cap adapted to be connected to the telephone, said cap at least partially defining an exterior face overlying the sound receiving element of the microphone and including means for allowing the passage of sound waves through the cap to said microphone.

3. Apparatus as recited in claim 2 wherein the keyboard elements are located around the periphery of the face of the mouthpiece cap.

4. Apparatus as recited in claim 1 wherein said keyboard elements are disposed in a circular ring circumscribing the sound receiving element of the relatively small microphone.

5. Apparatus as recited in claim 1 wherein said generating means includes a first printed circuit board having the keyboard elements mounted thereon, and a second printed circuit board electrically coupled intermediate the first printed circuit board and the transmitter connections, said second printed circuit board including an amplifier stage for amplifying said outer signal.

6. Apparatus as recited in claim 5 wherein the second printed circuit board is electrically coupled intermediate the relatively small microphone and the transmitter connections for amplifying the output of said relatively small microphone.

7. A method for providing tone operating capability to a dial telephone having a standard mouthpiece including a standard microphone electrically coupled to one or more transmitter connections in the telephone, said method comprising the steps of:
  removing the standard mouthpiece including the standard microphone from the telephone;
  installing a replacement mouthpiece by attaching said replacement to the telephone in place of the standard mouthpiece, said replacement mouthpiece including a relatively small microphone having a sound receiving element and a plurality of keyboard elements located generally around the sound receiving element of the microphone, said keyboard elements corresponding to respective telephone operating digits and symbols and adapted to be actuated by a user of the telephone;
  electrically coupling the relatively small microphone to the transmitter connections so that sound transmissions can be made through said transmitter connections;
  actuating the keyboard elements in sequence;
  generating an electrical output signal representing a tone signal responsive to the actuated keyboard elements; and
  transmitting said output signal through the transmitter connections in the telephone.

8. A method as recited in claim 7 and additionally comprising the steps of providing a single amplifier stage, and amplifying both the sound transmission and the output signals with said single amplifier stage.

9. Apparatus for providing tone operating capability to a dial telephone in which the standard mouthpiece including the microphone normally electrically coupled to one or more transmitter connections in the telephone is removed, said apparatus comprising:
  a mouthpiece cap adapted to be connected to the telephone in place of the removed mouthpiece, said cap at least partially defining an exterior face and including means for allowing the passage of sound waves through the cap at said face inward of the periphery of said face;
  a plurality of keyboard elements located at said exterior face, said elements corresponding to respective telephone operating digits and symbols, said elements adapted to be actuated by a user of the telephone;
  a relatively small microphone underlying said allowing means and operative responsively to sound passing through said exterior face, said relatively small microphone being electrically coupled to the transmitter connections upon attachment of the mouthpiece to said telephone; and
  means for generating an electrical output signal representing a tone signal responsive to the actuated keyboard elements, said generating means being electrically coupled to the transmitter connections upon attachment of the mouthpiece to said telephone to provide tone operating capability to said telephone.

10. Apparatus as recited in claim 9 wherein said keyboard elements are disposed in a circular ring circumscribing said allowing means.

11. Apparatus as recited in claim 9 wherein said allowing means comprises a plurality of holes through the cap.

12. Apparatus as recited in claim 9 wherein said generating means includes a first printed circuit board having the keyboard elements mounted thereon.

13. Apparatus as recited in claim 12 wherein said generating means additionally includes a second printed circuit board electrically coupled intermediate both the first printed circuit board and the relatively small microphone and the transmitter connections, said second printed circuit board including an amplifier stage for amplifying the output of the microphone and the output signal of said generating means.

14. Apparatus as recited in claim 9 wherein said plurality of keyboard elements includes a printed circuit board having a plurality of contact elements on a surface thereof, a spacer overlying said surface of the printed circuit board and having a plurality of holes exposing said contact elements on the printed circuit board, and a sheet of flexible material overlying the spacer and having a plurality of contact points on the underside thereof corresponding to the contact elements on the printed circuit board so that depression of the sheet engages the contact points on the underside of the sheet with the contact elements on the printed circuit board.

15. Apparatus for providing tone operating capability to a dial telephone in which the standard mouthpiece including the microphone normally electrically coupled to one or more transmitter connections in the telephone is removed, said apparatus comprising a replacement mouthpiece attachable to said telephone in place of the standard mouthpiece, said replacement mouthpiece including:
  a mouthpiece cap adapted to be connected to the telephone, said cap at least partially defining an exterior face and including means for allowing the passage of sound waves through the cap at said face inward of the periphery of said face;
  a plurality of keyboard elements disposed in a circular ring around said allowing means proximate the periphery of said exterior face, said elements corresponding to respective telephone operating digits and symbols, said elements adapted to be actuated by a user of the telephone;
  a relatively small microphone underlying the face of the mouthpiece cap operative responsively to sound passing through said exterior face, said relatively small microphone being electrically coupled to the transmitter connections upon attachment of the mouthpiece to said telephone; and
  means for generating an electrical signal representing a tone signal responsive to the actuated keyboard elements, said generating means being electrically coupled to the transmitter connections upon attachment of the mouthpiece to said telephone to provide tone operating capability to said telephone.

16. A method for providing tone operating capability to a dial telephone having a standard mouthpiece including a standard microphone electrically coupled to one or more transmitter connections in the telephone, said method comprising the steps of:

removing the standard mouthpiece including the standard microphone from the telephone;

installing a replacement mouthpiece by attaching said replacement mouthpiece to the telephone in place of the standard mouthpiece, said replacement mouthpiece including a relatively small microphone having a sound receiving element and a plurality of keyboard elements located generally around the sound receiving element of the microphone, said keyboard elements corresponding to respective telephone operating digits and symbols and adapted to be actuated by a user of the telephone and a generator responsive to the actuated keyboard elements to generate electrical signals representing tone signals; and electrically coupling the relatively small microphone and the generator to the transmitter connections so that sound transmissions and said electrical output signals can be transmitted through said transmitter connections.

17. A method as recited in claim 16 and additionally comprising the steps of providing a single amplifier stage, and amplifying both the sound transmission and the keyboard input with said single amplifier stage.

* * * * *